(12) United States Patent
Fry et al.

(10) Patent No.: US 8,995,105 B2
(45) Date of Patent: Mar. 31, 2015

(54) DEVICE CONTROL MODULES FOR DEMAND MANAGEMENT SYSTEMS

(71) Applicant: Tyco Electronics Corporation, Berwyn, PA (US)

(72) Inventors: Charles David Fry, New Bloomfield, PA (US); Brian Donald Stephenson, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 106 days.

(21) Appl. No.: 13/829,806

(22) Filed: Mar. 14, 2013

(65) Prior Publication Data

US 2014/0211362 A1    Jul. 31, 2014

Related U.S. Application Data (60) Provisional application No. 61/756,868, filed on Jan. 25, 2013.

(51) Int. Cl.
    *G05D 29/00* (2006.01)
    *H01H 47/22* (2006.01)
    *H02J 3/14* (2006.01)

(52) U.S. Cl.
    CPC ...... *H01H 47/22* (2013.01); *H02J 3/14* (2013.01); *H02J 2003/143* (2013.01); *H02J 2003/146* (2013.01)
    USPC .......................................................... 361/115

(58) Field of Classification Search
    USPC .......................................................... 361/115
    See application file for complete search history.

(56) References Cited

U.S. PATENT DOCUMENTS

| | | | |
|---|---|---|---|
| 2002/0002582 A1* | 1/2002 | Ewing et al. | 709/202 |
| 2010/0070217 A1 | 3/2010 | Shimada et al. | |
| 2010/0306559 A1* | 12/2010 | Ewing et al. | 713/300 |
| 2012/0029717 A1 | 2/2012 | Cox et al. | |
| 2012/0143387 A1 | 6/2012 | Indovina et al. | |
| 2012/0147802 A1 | 6/2012 | Ukita et al. | |
| 2012/0242207 A1* | 9/2012 | Mershon et al. | 312/237 |
| 2013/0033187 A1* | 2/2013 | Brown et al. | 315/201 |

FOREIGN PATENT DOCUMENTS

EP    2 375 527 A2    10/2011

OTHER PUBLICATIONS

International Search Report, International Application No. PCT/US2014/010581, International Filing Date, Jan. 8, 2014.

* cited by examiner

*Primary Examiner* — Ronald W Leja (57) ABSTRACT

A device control module for making a non-demand management system capable electrical device demand responsive to a demand management system includes a relay configured to be electrically connected to a power circuit of the electrical device to control power supply to a load device of the electrical device. The device control module includes a relay driver operated to open and close the relay and a controller operating the relay driver. The controller receives a demand state signal from the demand management system supplying power to the electrical device and operates the relay driver based on the demand state signal. The relay is configured to power off the load device of the electrical device irrespective of the main control operation of the electrical device.

20 Claims, 4 Drawing Sheets

DEVICE CONTROL MODULES FOR DEMAND MANAGEMENT SYSTEMS

CROSS REFERENCE TO RELATED APPLICATIONS

This application claims the benefit of U.S. Provisional Application No. 61/756,868 filed Jan. 25, 2013, the subject matter of which is herein incorporated by reference in its entirety.

BACKGROUND OF THE INVENTION

The subject matter herein relates generally to device control modules for making a non-demand management system capable electrical device demand responsive, such as to a demand management system or other demand response or load curtailment systems.

Demand management systems allow utility companies and/or consumers to control energy use and energy cost using smart electrical devices, such as home appliances, electronics, and the like. The demand management system provides technology and systems that allow the utility companies or consumers to automatically manage energy use and cost. The demand management system controls when and how the smart electrical devices are operated, such as to manage energy use more efficiently and enables consumers to save money. Examples of smart electrical devices include hot water heaters, furnaces with AC compressor control, heat pumps with electric heating elements, pool pumps and heaters, electric vehicle chargers, and the like.

Currently, there are a large number of electrical devices that are not able to connect to the demand management system, such as because the electrical devices use a non-electronic based control system or a control system that is incapable of communicating with the demand management system. Typical examples of such devices are electro-mechanical devices that lack control electronics. These devices will continue to represent a large portion of the market for many years. The cost of making such devices compatible with a demand management system capable of communicating with the demand management system is significant. The cost of converting the entire control system of such devices to electronic based systems that are demand management system compliant is a hurdle to manufacturing.

A need remains for modules that allow interconnection and intercommunication of non-demand management system capable electrical devices with the demand management system.

BRIEF DESCRIPTION OF THE INVENTION

In one embodiment, a device control module is provided for making a non-demand management system capable electrical device demand responsive to a demand management system. The device control module includes a relay configured to be electrically connected to a power circuit of the electrical device to control power supply to a load device of the electrical device. The device control module includes a relay driver operated to open and close the relay and a controller operating the relay driver. The controller receives a demand state signal from the demand management system supplying power to the electrical device and operates the relay driver based on the demand state signal. The relay is configured to power off the load device of the electrical device irrespective of the main control operation of the electrical device.

Optionally, the relay, relay driver and controller may be retrofit to the electrical device to shut off power to the load device of the electrical device irrespective of the main control operation of the electrical device. The relay may be normally closed and the relay driver may be operated to open the relay to shut off the power supply to the load device of the electrical device. The controller may be housed within the electrical device.

The device control module may include a printed circuit board configured to be coupled to the electrical device. The controller, relay driver and/or relay may be mounted to the printed circuit board. The device control module may include a faceplate assembly configured to be coupled to the electrical device. The controller, relay driver and/or relay may be coupled to the faceplate assembly and mounted to the electrical device with the faceplate assembly.

Optionally, the device control module may include a communication module that is demand management system compliant and configured to receive demand management system communication signals. The communication module may communicate with the controller. The communication module may generate the demand state signal based on the demand management system communication signals. The device control module may include a device connector configured to be coupled to an exterior of the electrical device. The communication module may be removably coupled to the device connector. The device connector may define a mating interface for the communication module to the electrical device.

Optionally, the controller may be housed within the communication module. The power circuit may be routed to the communication module through the device connector. Optionally, the communication module, controller and relay driver may be mounted to the printed circuit board. The relay may also be mounted to the printed circuit board.

Optionally, the demand management system communication signals may relate to at least one of a voltage or a frequency of the power on the power circuit. The demand management system communication signals may relate to at least one of demand on the demand management system, a load shed request from the demand management system, or pricing information of electricity on the demand management system.

DETAILED DESCRIPTION OF THE INVENTION

Embodiments described herein are for use in demand management systems. Embodiments described herein use device control modules to allow non-demand management system capable electrical devices to be demand responsive to a demand management system. Embodiments described herein use device control modules to make a non-demand management system capable electrical device operate as a smart electrical device. The non-demand management system capable electrical devices, when used with the device control modules described herein, operate as smart electrical devices, without extensive redesign of the electrical device. The device control modules may be retrofit modules used with the non-demand management system capable electrical devices to control operation of such devices to operate as smart electrical devices. The device control modules are demand responsive to a demand management system to allow consumers to control energy use and energy cost. The demand management system provides technology and systems that allow consumers to automatically manage their energy use and cost. The demand management system controls when and how the smart electrical devices are operated, such as to manage energy use more efficiently and enables utility companies to load shed during peak demand times and maintain grid stability.

Embodiments described herein provide connections between various communication modules and the electrical devices. Embodiments described herein may provide interconnectivity of communication modules with non-demand management system capable electrical devices.

Embodiments described herein provide device control modules that control operation of one or more elements of the electrical device in a manner consistent with a demand response management control protocol used in connection with a demand management system. Embodiments of the device control module provide an easy and inexpensive way for manufacturers of electrical devices to add demand response management capabilities to devices that do not have the necessary electrical circuitry to receive and decode demand state messages, such as high demand conditions, load shed conditions, pricing information, contract information, and the like, without adding significant cost or having significant design changes.

Embodiments of the device control module allow connection and communication of communication modules capable of communicating with a demand management system with electrical devices otherwise incapable of communicating with a demand management system. Communication modules may interface with the demand management system to control one or more operations of the electrical devices. The communication modules receive external signals requesting curtailment of electricity consumption or notifying of a raise in electricity rates or contract terms. The communication modules may communicate wirelessly with a demand management system or may communicate via a wired connection with the demand management system, such as through the power connection or power circuit of the electrical device itself. For example, the communication may be by radio wave, power line carrier (PLC) or by other communication methods.

Embodiments described herein may be used with various types of electrical devices, including home appliances, such as water heaters, clothes washers, clothes dryers, thermostats, pool pumps, refrigerators, dishwashers, and the like. Other types of electrical devices include consumer electricals, HVAC equipment, lighting, communications, networking, residential generators, electric vehicles, electric vehicle charging stations, and the like. The demand management system may have a dynamic pricing structure for the power delivered by the demand management system to the smart electrical devices. Local rate and timing information may be communicated by the demand management system to the communication modules, for adjusting the control of the smart electrical devices. For example, the utility company may communicate either directly with the communication module or indirectly with the communication module, such as along the power grid. Optionally, within a consumer's home, smart meters or a home energy management system may be provided. Such smart meters or home energy management system may communicate with the communication module for controlling the electrical devices. The demand management system communication may come from a load supplying entity or curtailment service provider.

Figure 1:
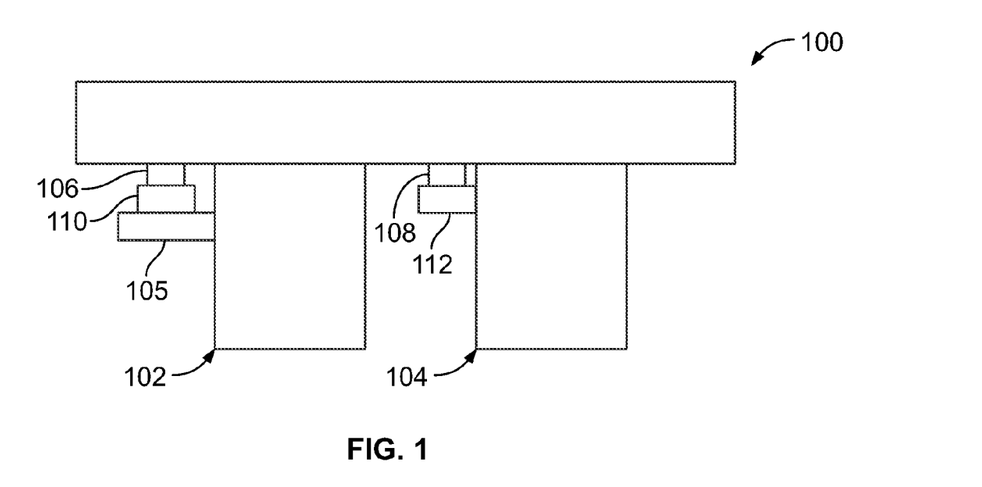
FIG. 1 is a schematic illustration of a demand management system formed in accordance with an exemplary embodiment.

FIG. 1 is a schematic illustration of a demand management system 100 formed in accordance with an exemplary embodiment. In the illustrated embodiment, a first smart electrical device 102 and a second smart electrical device 104 are both connected to the demand management system 100. Any number of smart electrical devices may be connected to the demand management system 100. The smart electrical devices 102, 104 are powered by the demand management system 100.

In the illustrated embodiment, the first smart electrical device 102 includes a device control module 105 integrated into the electrical device 102 to make the electrical device 102 a smart electrical device 102. The electrical device 102 is a non-demand management system capable electrical device, and without the device control module 105, the electrical device 102 would not be capable of operating in accordance with a demand response management protocol. The device control module 105 performs control functions for the electrical device 102 that allow the electrical device 102 to perform in accordance with a demand response management protocol. Optionally, the first smart electrical device may be an electro-mechanical device lacking control electronics 102 for the main operation of the electrical device 102. The device control module 105 provides additional control to make the electrical device a smart electrical device.

In contrast, the second smart electrical device 104 is designed with built-in electronic control of the electrical device 104 that is responsive to demand response management protocols. The second smart electrical device 104 does not include a separate device control module to control operation thereof.

In an exemplary embodiment, first and second communication modules 106, 108, are connected to the first and second smart electrical devices 102, 104, respectively. For example, the first and second communication modules 106, 108 are connected to first and second device connectors 110, 112 of the first and second smart electrical devices 102, 104, respectively. The first communication module 106 communicates directly with the device control module 105 to control operation of the electrical device 102. Similarly, the communication module 108 communicates directly with the built-in control circuitry of the second smart electrical device 104 to control operation of the electrical device 104.

While the device control module 105 is illustrated as being part of the electrical device 102, it is realized that one or more components of the device control module 105 may be integrated into the communication module 106. For example, control of the electrical device 102 may be performed by a processor or controller within the communication module 106. In other alternative embodiments, rather than being separate modules attached to the electrical devices, the communication modules 106 and/or 108 may be integrated into the electrical devices 102, 104. For example, the communication module 106 may be an integral part of the device control module 105.

The communication modules 106, 108 receive data from the demand management system 100 for controlling the operation of the smart electrical devices 102, 104. Optionally, the communication modules 106, 108 may receive data communicated over the lines of the demand management system 100 that are hard wired to the smart electrical devices 102, 104. For example, data may be communicated along the lines of the demand management system 100 that supplies power to the smart electrical devices 102, 104 in addition to power. The data may be processed to control the operation of the smart electrical devices 102, 104. Optionally, the communication modules 106, 108 may receive data from the demand management system 100 wirelessly as opposed to receiving the data over the lines hardwired to the smart electrical devices 102, 104. Optionally, the communication modules 106, 108 may receive data both wirelessly and across the lines hardwired to the smart electrical devices 102, 104. The communication modules 106, 108 may both transmit and receive data in exemplary embodiments. The communication modules 106, 108 may operate in accordance with a standard demand response management protocol. For example, the communication modules 106, 108 may be designed to operate under an RS-485 communication protocol, an SPI communication protocol, or another standardized communication protocol. The demand management system 100 may be any type of demand management system. For example, the demand management system 100 may be a smart grid system. The demand management system may be a demand response system, a load shedding system, a load curtailment system, and the like. The systems may use any type of communication and control protocols. The systems may be demand based, time based or based on other factors to control electricity consumption.

Figure 2:
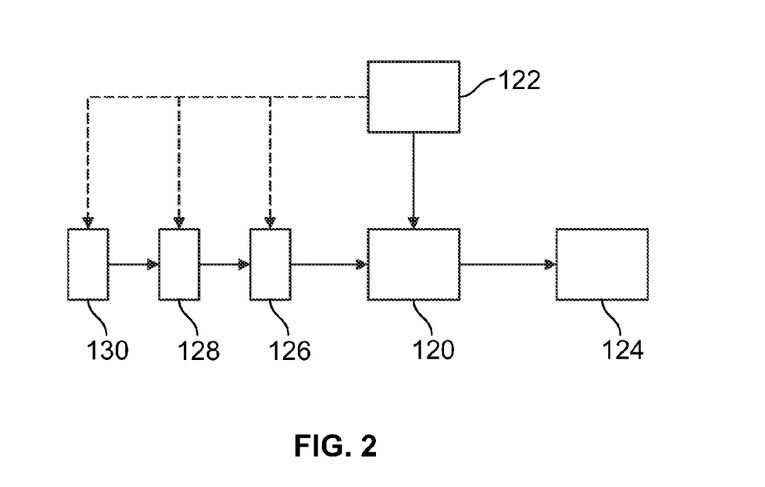
FIG. 2 is a schematic illustration of the device control module for the demand management system formed in accordance with an exemplary embodiment.

FIG. 2 is a schematic illustration of the device control module 105 formed in accordance with an exemplary embodiment. The device control module 105 includes a relay 120 configured to be electrically connected to a power circuit 122 of the electrical device 102 (shown in FIG. 1) to control power supply to a load device 124 of the electrical device 102. The device control module 105 includes a relay driver 126 operated to open and close the relay 120. The device control module 105 includes a controller 128 operating the relay driver 126. The controller 128 receives a demand state signal from the demand management system 102 supplying power to the electrical device 102. The controller 128 operates the relay driver 126 based on the demand state signal. The relay 120 is configured to power off the load device 124 of the electrical device 102 irrespective of the main control operation of the electrical device 102. The relay 120 is normally closed to have no effect on normal operation and to reduce the number of cycles on the relay 120 and to insure that normal operation is not affected when no device control module 105 is connected.

The relay 120 is used to turn off the power supply to the load device 124, thus affecting the control of the electrical device 102. The relay 120 is operated independently of the main control operation of the electrical device 102 and is operated in accordance with a demand response management protocol. As such, the addition of the relay 120 into the electrical device 102 converts the electrical device 102 from a non-demand management system capable electrical device to a demand management system capable electrical device or a smart electrical device. The load device 124, which may be the main power consuming element(s) of the electrical device 102, may be shut off by controlling the state of the relay 120. Other parts of the electrical device 102 may still function even with the load device 124 being shut off. Optionally, one leg of the power circuit 122 may be connected to the relay 120 and the relay 120 may open to shut down the power supply of the power circuit 122, such as to stop the power supply to the load device 124. The device control module 105 may include a power take off from the power circuit 122 to operate other components of the device control module 105, such as the controller 128, a communication module 130, relay driver 126, and the like.

In an exemplary embodiment, the device control module 105 includes the communication module 130 that is communicatively coupled to the controller 128. The communication module 130 is demand management system compliant and is configured to receive demand management system communication signals. The communication module 130 generates the demand state signals based on the demand management system communication signals.

Optionally, some or all of the components of the device control module 105 may be housed together as part of a single module. For example, the components of the device control module 105 may be housed within a faceplate assembly configured to be coupled to the electrical device 102 as a single unit or assembly. Portions of the faceplate assembly may be located interior of the casing or shell of the electrical device 102 while other portions of the faceplate assembly may be located exterior of the casing or shell of the electrical device 102. The electrical module 102 may be retrofit with the faceplate assembly. For example, an existing faceplate of the electrical module 102 may be removed and replaced with the demand management system compliant faceplate assembly including the device control module 105. The existing faceplate may include dials, switches, inputs, buttons, keys, a user interface, a display or other components used for controlling the electrical device 102. Similar components may be included with the retrofit faceplate assembly that includes the device control module 105. The device control module 105 provides additional control that is demand management system and/or demand response compliant.

Optionally, the device control module 105 may include a printed circuit board. One or more of the components of the device control module 105 may be mounted to the printed circuit board. The printed circuit board may be housed within the faceplate assembly. Alternatively, the printed circuit board may be housed within the electrical device 102 separate from a faceplate.

The components of the device control module 105 may be separated and placed in different parts of the electrical device 102. For example, some of the components may be housed within the electrical device 102 while other components are housed in separate modules, which may be coupled to the electrical device 102. In an exemplary embodiment, the communication module 130 may be a separate module connected to a device connector at an exterior of the electrical device 102. Optionally, some of the other components of the device control module 105 may be housed within the communication module 130. For example, the controller 128 may be housed within the communication module 130.

In an exemplary embodiment, the relay 120 may be separate from the other components of the device control module 105. The relay 120 may be positioned at the load device 124 for controlling the load device 124. The relay 120 may be connected to the relay driver 126 and/or printed circuit board by a wire.

Figure 3:
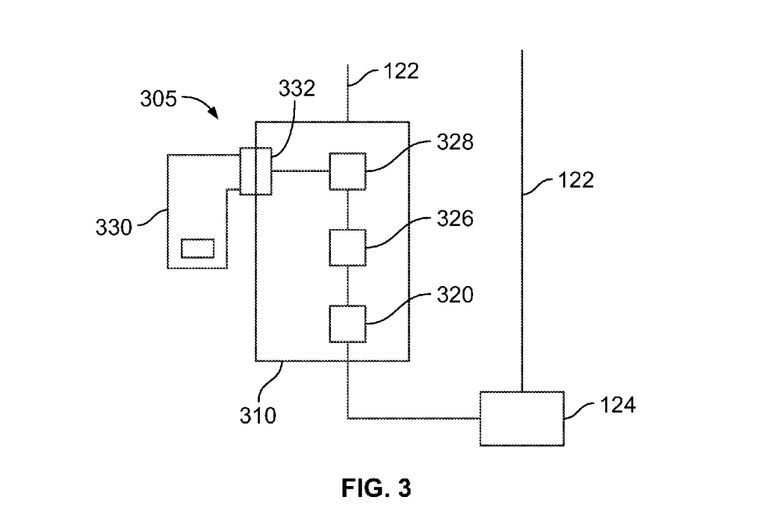
FIG. 3 is a schematic illustration of an exemplary embodiment of a device control module in accordance with an exemplary embodiment.

FIG. 3 is a schematic illustration of an exemplary embodiment of a device control module 305 in accordance with an exemplary embodiment. The device control module 305 is an exemplary implementation of the device control module 105. The device control module 105 may be used in place of the device control module 105 within the electrical device 102.

The device control module 305 includes a printed circuit board 310. A relay 320, relay driver 326 and controller 328 are mounted to the printed circuit board 310. A communication module 330 is communicatively coupled to the controller 328 and/or other components of the device control module 305 via a device connector 332 mounted to the printed circuit board 310. Optionally, the device connector 332 may be mounted separate from the printed circuit board 310, such as directly to a faceplate assembly or to the shell or casing of the electrical device 102.

The relay 320 is operatively coupled to the load device 124. The relay driver 326 is operatively coupled to the relay 320. The controller 328 is operatively coupled to the relay driver 326. The communication module 330 is operatively coupled to the controller 328. The communication module 330 is demand management system compliant and configured to transmit and/or receive demand responsive communications in accordance with at least one communication protocol. The communication module 330 is communicatively coupled to the demand management system. For example, the communication module 330 may communicate wirelessly with the demand management system, may communicate via a wired connection with the demand management system, such as through the power connection or power circuit 122 of the electrical device 102, or may communicate by other means. In the illustrated embodiment, the power circuit 122 is connected to the printed circuit board 310. The power circuit 122 may be connected to the communication module 330 such that the communication module 330 may monitor signals transmitted along the power circuit 122 and/or monitor changes in the power supply, such as a rate decline in either or both a voltage and a frequency, a magnitude of decline in either or both a voltage and a frequency and the like, which may be indicative of a demand condition, load shed condition, and the like. For example, because the line voltage and frequency typically decrease when the power grid is experiencing excessive demand, monitoring for decreases in the voltage and/or frequency may be indicative of a high demand condition on the electricity grid, which may trigger the device control module 305 to shut down the power to the load device 124. The device control module 305 may be self-responsive to the local state of the electricity grid to which the electrical device 102 is attached by self monitoring the voltage and frequency on the power circuit and may not need to receive any communication signals from a load supplying entity, curtailment service provider, smart meters, home power management systems, and the like.

Optionally, the power circuit 122 may be connected to the controller 328, relay driver 326 and/or relay 320. Optionally, a power converter, such as an AC/DC converter may be mounted to the printed circuit board 310. The power supply may supply power to one or more of the components of the device control module 305, including the communication module 330.

In operation, the communication module 330 may receive demand management system communication signals, such as signals relating to demand conditions, load shed conditions, pricing information, contract information or other types of demand management system communication signals. The communication module 330 may generate and transmit demand state signals based on the demand management system communication signals. In an exemplary embodiment, demand state signals are transmitted from the communication module 330 to the controller 328. The controller 328 operates the relay driver 326 based on the demand state signals. When an activation condition exists (e.g. a demand condition, load shed condition, and the like) requiring that the electrical device 102 conserve power and/or shut down, the relay driver 326 opens the relay 320 to shut of the power supply on the power circuit 122 to the load device 124. The relay driver 326 generates a voltage to pull open the relay 320 to drop the load device 124 offline and stop consumption of electricity.

Switching of the relay 320 controls operation of the load device 124. For example, opening of the relay 320 cuts the power supply to the load device 124, thus turning off the load device 124. The power consumption of the electrical device 102 is reduced by turning off the load device 124. Optionally, when the load device 124 is turned off, the entire electrical device 102 is shut down. Alternatively, when the load device 124 is turned off, portions of the electrical device 102 no longer operate, while other portions of the electrical device 102 continue to operate as normal. Optionally, when the load device 124 is turned off, the electrical device 102 may delay operation until the load device 124 is turned back on. For example, the electrical device 102 may stop mid-cycle, and then resume the cycle when power supply is restored to the load device 124.

In an exemplary embodiment, the device connector 332 may be a CEA (Consumer Electricals Association) 2045 demand management system device connector, which is a standard modular socket interface connector. The communication module 330 may be a CEA 2045 communication module, with circuitry to detect demand state, load shed state or other demand management system signals. The components may be manufactured in accordance with other standards other than the CEA standards. Optionally, the pins of the CEA 2045 device connector may be connected to the mains power and ground lines of the electrical device 102. The reserved pin 3 is connected to the relay and a relay pull-open voltage is generated in response to a demand state or load shed state to open the relay 320 and stop power supply to the load device 124. Other pins may be used to pass power and/or data signals to and/or from the communication module 330 to control the relay 320. The relay 320 is held open during the demand state, which may last for a predetermined period of time or until the demand state ceases, then the voltage is removed and the relay 320 closes to resume normal operation. Optionally, the circuitry used to generate the pull-open voltage may be part of the communication module 330. Optionally, the circuitry used to generate the pull-open voltage may be part of the printed circuit board 310 and/or the controller 328.

Figure 4:
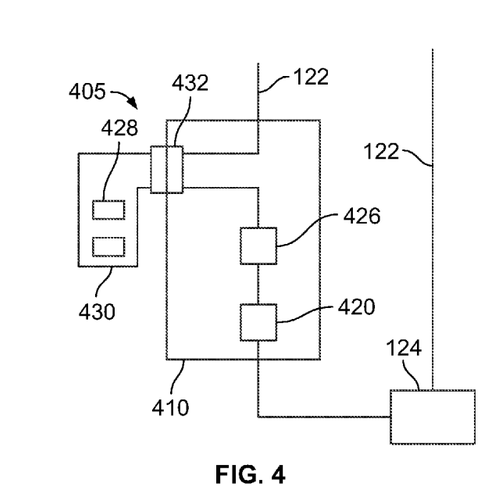
FIG. 4 is a schematic illustration of an exemplary embodiment of a device control module in accordance with an exemplary embodiment.

FIG. 4 is a schematic illustration of an exemplary embodiment of a device control module 405 in accordance with an exemplary embodiment. The device control module 405 is an exemplary implementation of the device control module 105. The device control module 105 may be used in place of the device control modules 105, 305 within the electrical device 102.

The device control module 405 includes a printed circuit board 410. A relay 420 and relay driver 426 are mounted to the printed circuit board 410. A communication module 430 is communicatively coupled to the printed circuit board 410 and/or other components of the device control module 405 via a device connector 432 mounted to the printed circuit board 410. A controller 428 is mounted within the communication module 430.

The relay 420 is operatively coupled to the load device 124. The relay driver 426 is operatively coupled to the relay 420. The controller 428 is operatively coupled to the relay driver 426 through the device connector 432 and the printed circuit board 410. The communication module 430 is communicatively coupled to the demand management system. For example, the communication module 430 may communicate wirelessly with the demand management system, may communicate via a wired connection with the demand management system, such as through the power connection or power circuit 122 of the electrical device 102, or may communicate by other means. Optionally, the power circuit 122 may be connected to the controller 428, relay driver 426 and/or relay 420.

Figure 5:
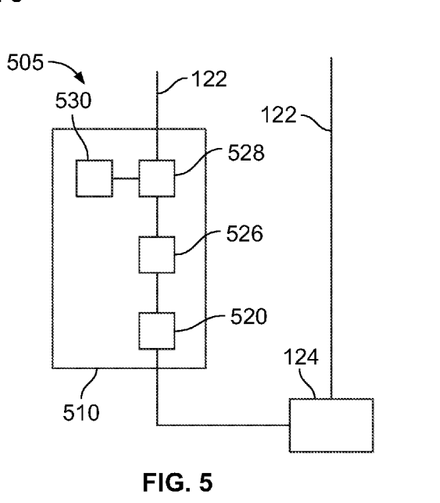
FIG. 5 is a schematic illustration of an exemplary embodiment of a device control module in accordance with an exemplary embodiment.

FIG. 5 is a schematic illustration of an exemplary embodiment of a device control module 505 in accordance with an exemplary embodiment. The device control module 505 is an exemplary implementation of the device control module 105. The device control module 105 may be used in place of the device control modules 105, 305, 405 within the electrical device 102.

The device control module 505 includes a printed circuit board 510. A relay 520, relay driver 526, controller 528 and communication module 530 are mounted to the printed circuit board 510. The relay 520 is operatively coupled to the load device 124. The relay driver 526 is operatively coupled to the relay 520. The controller 528 is operatively coupled to the relay driver 526. The communication module 530 is communicatively coupled to the controller 528 and to the demand management system. For example, the communication module 530 may communicate wirelessly with the demand management system, may communicate via a wired connection with the demand management system, such as through the power connection or power circuit 122 of the electrical device 102, or may communicate by other means. Optionally, the power circuit 122 may be connected to the controller 528, relay driver 526 and/or relay 520.

Figure 6:
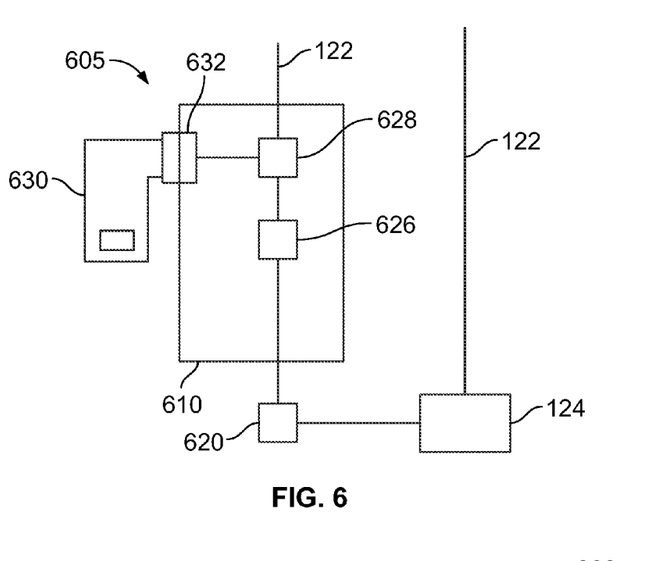
FIG. 6 is a schematic illustration of an exemplary embodiment of a device control module in accordance with an exemplary embodiment.

FIG. 6 is a schematic illustration of an exemplary embodiment of a device control module 605 in accordance with an exemplary embodiment. The device control module 605 is an exemplary implementation of the device control module 105. The device control module 105 may be used in place of the device control modules 105, 305, 405, 505 within the electrical device 102.

The device control module 605 includes a printed circuit board 610. A relay 620 is provided remote from the printed circuit board 610 and is connected to the printed circuit board 610 and components thereof by at least one line or cable. A relay driver 626 and controller 628 are mounted to the printed circuit board 610. A communication module 630 is communicatively coupled to the printed circuit board 610 and/or other components of the device control module 605 via a device connector 632 mounted to the printed circuit board 610.

The relay 620 is operatively coupled to the load device 124. The relay driver 626 is operatively coupled to the relay 620. The controller 628 is operatively coupled to the relay driver 626. The communication module 630 is communicatively coupled to the controller 628 and to the demand management system. Optionally, the power circuit 122 may be connected to the controller 628, relay driver 626 and/or relay 620.

Figure 7:
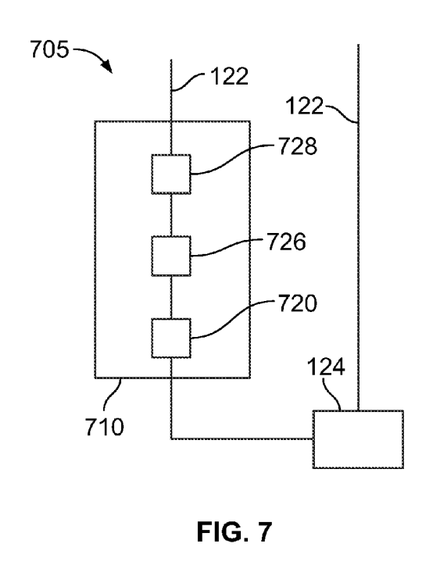
FIG. 7 is a schematic illustration of an exemplary embodiment of a device control module in accordance with an exemplary embodiment.

FIG. 7 is a schematic illustration of an exemplary embodiment of a device control module 705 in accordance with an exemplary embodiment. The device control module 705 is an exemplary implementation of the device control module 105. The device control module 105 may be used in place of the device control modules 105, 305, 405, 505, 605 within the electrical device 102.

The device control module 705 includes a printed circuit board 710. A relay 720, relay driver 726 and controller 728 are mounted to the printed circuit board 710. The device control module 705 does not include a separate communication module as with other embodiments. Rather, the controller 728 is connected to the power circuit 122 and monitors for demand state signals transmitted along the power circuit 122, such as changes in the power supply, such as changes in a voltage, a frequency, a change in voltage, a change in frequency, and the like, which may be indicative of a demand condition, load shed condition, and the like. The controller 728 operates the relay driver 726 based on the demand state signals.

The relay 720 is operatively coupled to the load device 124. The relay driver 726 is operatively coupled to the relay 720. The controller 728 is operatively coupled to the relay driver 726. Optionally, the power circuit 122 may be connected to the controller 728, relay driver 726 and/or relay 720.

Figure 8:
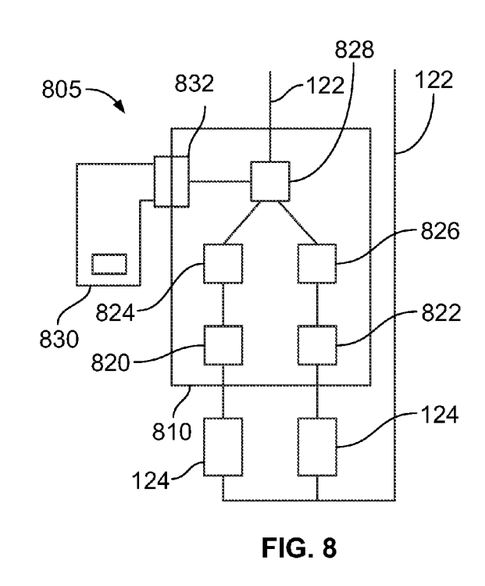
FIG. 8 is a schematic illustration of an exemplary embodiment of a device control module in accordance with an exemplary embodiment.

FIG. 8 is a schematic illustration of an exemplary embodiment of a device control module 805 in accordance with an exemplary embodiment. The device control module 805 is an exemplary implementation of the device control module 105. The device control module 105 may be used in place of the device control modules 105, 305, 405, 505, 605 within the electrical device 102.

The device control module 805 includes a printed circuit board 810. A first relay 820, a second relay 822, a first relay driver 824, a second relay driver 826 and a controller 828 are mounted to the printed circuit board 810. A communication module 830 is communicatively coupled to the printed circuit board 810 and/or other components of the device control module 805 via a device connector 832 mounted to the printed circuit board 810.

The first and second relays 820, 822 are operatively coupled to different load devices 124 of the electrical device 102. The relay drivers 824, 826 are operatively coupled to the relays 820, 822, respectively. The controller 828 is operatively coupled to the relay drivers 824, 826. The communication module 830 is communicatively coupled to the controller 828 and to the demand management system. Optionally, the power circuit 122 may be connected to the controller 828, relay drivers 824, 826 and/or relays 820, 822. Optionally, the relays 820, 822 may be connected to different power circuits. Separate load devices 124 may be independently controlled by the device control module 805. For example, either load device or both load devices may be on or off depending on the demand of the demand management system.

Figure 9:
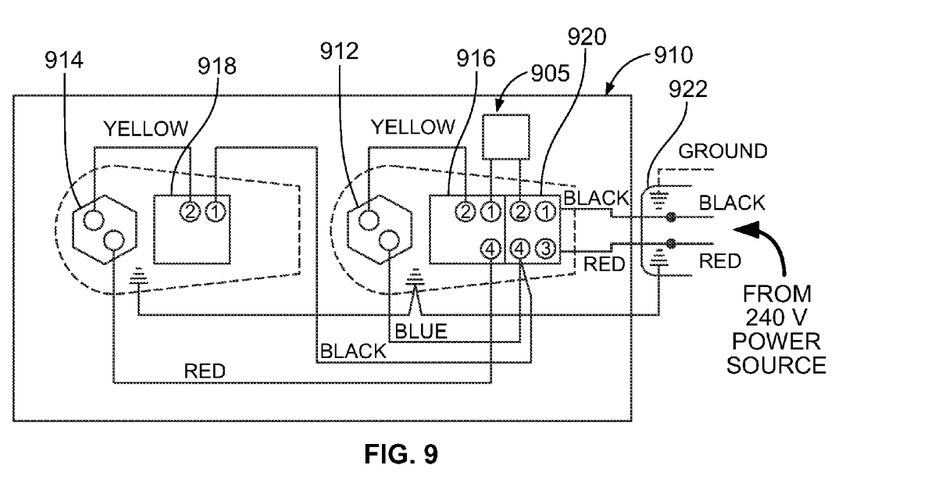
FIG. 9 illustrates is a schematic illustration of an exemplary embodiment of a device control module in accordance with an exemplary embodiment.

FIG. 9 illustrates is a schematic illustration of an exemplary embodiment of a device control module 905 in accordance with an exemplary embodiment. The device control module 905 is used in an electrical device, represented in FIG. 9 by a hot water heater 910; however other types of electrical devices may be used in alternative embodiments. The hot water heater 910 includes a first load device 912, represented by an upper heating element of the hot water heater 910, and a second load device 914, represented by a lower heat element of the hot water heater 910. The hot water heater 910 includes an upper temperature control thermostat 916 for controlling operation of the upper heating element or first load device 912 and a lower temperature control thermostat 918 for controlling operation of the lower heating element or second load device 914. The hot water heater 910 includes a high limit switch 920 for supplying power to the load devices 912, 914 via the thermostats 916, 918. A junction box 922 supplies power to the switch 920.

The device control module 905 is connected between the switch 920 and the upper thermostat 916. Optionally, the device control module 905 may be positioned between the thermostat 916 and the upper load device 912. Optionally, the device control module 905 may be connected between the switch 920 and the lower thermostat 918 in lieu of or in addition to being positioned between the switch 920 and the upper thermostat 916. Optionally, multiple device control modules may be used, one for the upper load device 912 and one for the lower load device 914.

The device control module 905 is used to open the power circuit supplying power to the first load device 912. The first load device 912 is turned off when the device control module 905 is activated. In an exemplary embodiment, the device control module 905 includes a normally closed relay that is opened to stop power supply to the first load device 912. The relay may be controlled by a relay driver and controller. The relay may be controlled based on demand state signals received from the demand management system. A communication module may receive signals from the demand management system for controlling the operation of the relay. The hot water heater 910 is thus demand responsive by tapping into the power circuit and controlling a relay to open and close the power circuit in response to demand management system communication signals. Optionally, the device control module 905 may include a circuit board with one or more components mounted thereto. Alternatively, no circuit board is needed, but rather the components may be mounted within the faceplate assembly or other part of the electronic device 910. Optionally, one leg of the power circuit may be connected to the relay and the relay may open to shut down the power supply of the power circuit, such as to stop the power supply to the first load device 912. The device control module 905 may include a power take off from the power circuit to operate other components of the device control module, such as the controller, communication module, relay driver and the like.

The device control module 905 may be a retrofit device tapped into the power circuit to control the power supply, even though the hot water heater 910 was not manufactured or designed to be demand responsive or to work with the demand management system.

Figure 10:
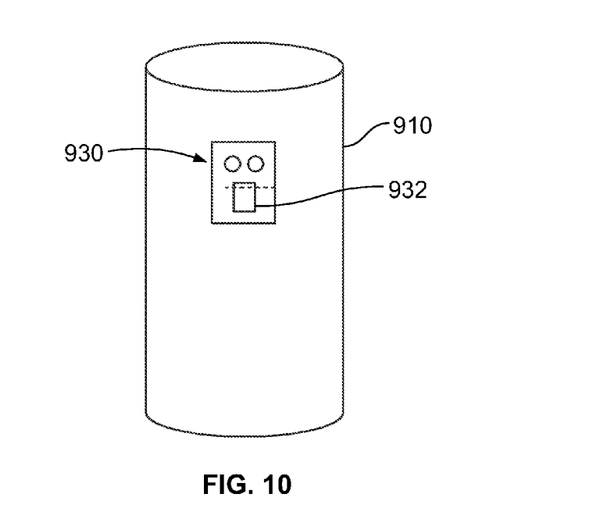
FIG. 10 illustrates the device control module coupled to an electrical device.

FIG. 10 illustrates the device control module 905 coupled to the hot water heater 910. The device control module 905 is integrated into a faceplate assembly 930. The faceplate assembly 930 is attached to an exterior of the hot water heater 910 such that the device control module 905 is accessible from the exterior of the hot water heater 910. The faceplate assembly 930 may be attached in an access area of the hot water heater 910 where the mains wiring is connected to other components of the hot water heater 910, such as at the switch 920 (shown in FIG. 9). The relay may be connected in line with one phase of the mains wiring, such as between the switch 920 and the thermostat 916 (shown in FIG. 9).

The faceplate assembly 930 may hold a printed circuit board with the components of the device control module 905 mounted thereto. A communication module 932 is plugged into the faceplate assembly 930. The communication module 932 may be removably coupled to the faceplate assembly 930. The communication module 932 may be removed and replaced with a different communication module, such as a communication module that operates in accordance with a different protocol or standard. The system may thus be easily upgraded over time by replacing the communication module 932.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A device control module for making a non-demand management system capable electrical device demand responsive to a demand management system, the device control module comprising:
    a relay configured to be electrically connected to a power circuit of the electrical device to control power supply to a load device of the electrical device;
    a relay driver operated to open and close the relay; and
    a controller operating the relay driver, the controller receiving a demand state signal from the demand management system supplying power to the electrical device, the controller operating the relay driver based on the demand state signal;
    wherein the relay is configured to power off the load device of the electrical device irrespective of the main control operation of the electrical device; and
    wherein at least one of the relay, relay driver and controller are physically housed within an interior portion of an exterior shell of the electrical device.

2. The device control module of claim 1, wherein the relay is normally closed, the relay driver being operated to open the relay to shut off the power supply to the load device of the electrical device.

3. The device control module of claim 1, further comprising a communication module being demand management system compliant and configured to receive demand management system communication signals, the communication module communicating with the controller, the communication module generating the demand state signal based on the demand management system communication signals.

4. The device control module of claim 1, further comprising a printed circuit board, the controller, relay driver and relay being mounted to the printed circuit board, the printed circuit board configured to be coupled to the electrical device.

5. The device control module of claim 1, further comprising a faceplate assembly configured to be coupled to the electrical device, the controller, relay driver and relay being coupled to the faceplate assembly and mounted to the electrical device with the faceplate assembly.

6. The device control module of claim 1, further comprising a device connector configured to be coupled to an exterior of the electrical device and a communication module removably coupled to the device connector, the device connector defining a mating interface for the communication module to the electrical device.

7. The device control module of claim 1, wherein the relay is physically coupled to the power circuit of the electrical device within the electrical device.

8. The device control module of claim 1, further comprising a communication module being demand management system compliant and configured to receive demand management system communication signals, the communication module generating the demand state signal based on the demand management system communication signals, the controller being housed within the communication module, the communication module being coupled to a device connector mounted to the electrical device.

9. The device control module of claim 1, further comprising a device connector configured to be coupled to an exterior of the electrical device and a communication module removably coupled to the device connector, the controller being part of the communication module, wherein the power circuit is routed to the communication module through the device connector.

10. The device control module of claim 1, further comprising a communication module configured to receive demand management system communication signals from the demand management system and a printed circuit board configured to be mounted within the electrical device, the communication module, controller and relay driver being mounted to the printed circuit board, the communication module generating the demand state signals based on the demand management system communication signals.

11. The device control module of claim 10, wherein the relay is mounted to the printed circuit board.

12. The device control module of claim 10, wherein the demand management system communication signals relate to at least one of a voltage or a frequency of the power on the power circuit.

13. The device control module of claim 10, wherein the demand management system communication signals relate to at least one of demand on the demand management system, a load shed request from the demand management system, pricing information of electricity on the demand management system.

14. The device control module of claim 1, wherein the relay, relay driver and controller are retrofit to the electrical device to shut off power to the load device of the electrical device irrespective of the main control operation of the electrical device.

15. A device control module for making a non-demand management system capable electrical device demand responsive to a demand management system, the device control module comprising:
a relay configured to be electrically connected to a power circuit of the electrical device to control power supply to a load device of the electrical device;
a printed circuit board configured to be coupled to the electrical device, the printed circuit board being physically housed within an interior portion of an exterior shell of the electrical device;
a relay driver mounted to the printed circuit board, the relay driver operated to open and close the relay;
a controller mounted to the printed circuit board, the controller operating the relay driver based on a demand state signal from the demand management system supplying power to the electrical device; and
a device connector mounted to the circuit board, the device connector having a mating interface; and
a communication module coupled to the device connector, the communication module being demand management system compliant and configured to receive demand management system communication signals, the communication module communicating with the controller, the communication module generating the demand state signal based on the demand management system communication signals;
wherein the controller is configured to operate the relay to power off the load device of the electrical device irrespective of the main control operation of the electrical device.

16. The device control module of claim 15, wherein the relay is mounted to the printed circuit board.

17. The device control module of claim 15, wherein the device connector is positioned at an exterior of the electrical device, the communication module being mated with the device connector from an exterior of the electrical device.

18. The device control module of claim 15, further comprising a faceplate assembly configured to be coupled to the electrical device such that a portion of the faceplate assembly is accessible at an exterior of the electrical device, wherein the printed circuit board is held by the faceplate assembly with the device connector exposed exterior of the faceplate assembly and the communication module coupled to the device connector exterior of the faceplate assembly.

19. A device control module for making a non-demand management system capable electrical device demand responsive to a demand management system, the device control module comprising:
a faceplate assembly configured to be coupled to an exterior shell of the electrical device such that a portion of the faceplate assembly is accessible at an exterior of the electrical device and a portion of the faceplate assembly is positioned interior of the exterior shell of the electrical device;
a relay held by the faceplate assembly, the relay configured to be electrically connected to a power circuit of the electrical device to control power supply to a load device of the electrical device, the relay being physically positioned interior of the exterior shell of the electrical device;
a relay driver held by the faceplate assembly, the relay driver operated to open and close the relay;
a communication module held by the faceplate assembly, the communication module being demand management system compliant and configured to receive demand management system communication signals, the communication module generating a demand state signal based on the demand management system communication signals; and
a controller held by the faceplate assembly, the controller communicating with the communication module and receiving the demand state signal, the controller operating the relay driver based on a demand state signal, wherein the controller is configured to operate the relay to power off the load device of the electrical device irrespective of the main control operation of the electrical device.

20. The device control module of claim 19, further comprising a printed circuit board held by the faceplate assembly, wherein the controller, relay driver and relay are mounted to the printed circuit board.

* * * * *